(12) United States Patent
Seitz

(10) Patent No.: US 7,862,319 B2
(45) Date of Patent: Jan. 4, 2011

(54) ADJUSTMENT METHOD, PARTICULARLY A LASER ADJUSTMENT METHOD, AND AN ACTUATOR SUITABLE FOR THE SAME

(75) Inventor: Burkhard Arthur Seitz, München (DE)

(73) Assignee: Finisar Corporation, Sunnyvale, CA (US)

( * ) Notice: Subject to any disclaimer, the term of this patent is extended or adjusted under 35 U.S.C. 154(b) by 1058 days.

(21) Appl. No.: 10/473,940

(22) PCT Filed: Apr. 12, 2002

(86) PCT No.: PCT/DE02/01379

§ 371 (c)(1),
(2), (4) Date: Mar. 10, 2006

(87) PCT Pub. No.: WO02/084357

PCT Pub. Date: Oct. 24, 2002

(65) Prior Publication Data

US 2008/0315443 A1    Dec. 25, 2008

(30) Foreign Application Priority Data

Apr. 12, 2001   (DE) ................. 101 18 451

(51) Int. Cl.
*H05B 6/00* (2006.01)
(52) U.S. Cl. ............... 425/143; 425/135; 425/150; 264/405; 264/482; 264/230
(58) Field of Classification Search ............. 264/1.27, 264/405, 482, 230; 425/135, 143, 150

See application file for complete search history.

(56) References Cited

U.S. PATENT DOCUMENTS 5,195,155 A    3/1993   Shimaoka et al.

(Continued)

FOREIGN PATENT DOCUMENTS

DE    2918100    11/1980

(Continued)

OTHER PUBLICATIONS

U.S. Appl. No. 10/473,942, Hubner (claims priority to DE 0201380).

(Continued)

*Primary Examiner*—Khanh Nguyen
*Assistant Examiner*—Saeed M Huda
(74) *Attorney, Agent, or Firm*—Workman Nydegger

(57) ABSTRACT

The invention relates to an adjustment method, especially for the adjustment of optical or fiber optical components, whereby a partial region of an actuator is locally heated in such a defined manner that compressive stresses are created therein as a result of the restricted thermal expansion of said heated partial region, caused by at least one other partial region of the actuator. If the yielding point σ of the material of the partial region is exceeded, said compressive stresses lead to the plastic compression of the heated partial region. Furthermore, said heated partial region is contracted during cooling and leads to a defined modification of the geometry of the actuator following the cooling process. Tensile stresses are created as a result of a restriction of said contraction by means of at least one other partial region in the previously heated partial region, and compressive stresses are frozen in the at least one other region. During the adjustment process, essential regions of the actuator, in which the tensile stresses or compressive stresses are frozen after cooling, are brought to a critical temperature in relation to the operating temperature of the actuator, at least until flow processes of the material are ended at the critical temperature.

13 Claims, 2 Drawing Sheets

U.S. PATENT DOCUMENTS

Figure 1A:
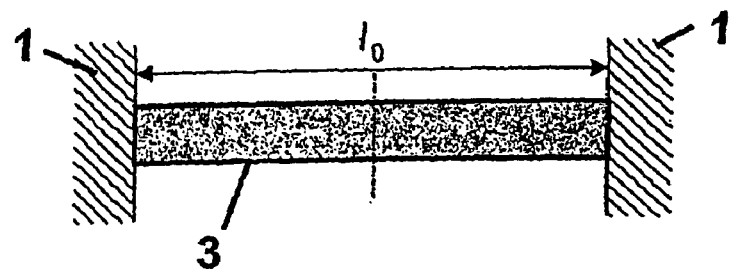

| | | | |
|---|---|---|---|
| 5,347,415 | A | 9/1994 | Murata et al. |
| 5,537,276 | A | 7/1996 | Mukae et al. |
| 5,870,417 | A | 2/1999 | Verdiell et al. |
| 5,914,972 | A | 6/1999 | Siala et al. |
| 6,092,914 | A * | 7/2000 | Esakoff et al. .............. 362/268 |
| 6,154,952 | A | 12/2000 | Tangren |
| 2002/0021480 | A1 | 2/2002 | Auracher et al. |
| 2004/0141697 | A1 | 7/2004 | Hubner |
| 2004/0190570 | A1 | 9/2004 | Hubner |

FOREIGN PATENT DOCUMENTS

| | | |
|---|---|---|
| DE | 3875078 T2 | 2/1993 |
| DE | 19704502 | 2/1998 |
| DE | 19752028 | 6/1999 |
| DE | 69415437 | 6/1999 |
| DE | 19805849 | 9/1999 |
| DE | 10037975 | 2/2002 |
| DE | 0202143 | 6/2002 |
| EP | 0488658 | 6/1992 |
| EP | 0638895 * | 8/1994 |
| EP | 0 373 225 B1 | 12/1994 |
| EP | 0 638 895 B1 | 12/1998 |
| EP | 1053576 | 11/2000 |
| EP | 1186927 | 3/2002 |
| JP | 57198415 | 12/1982 |
| JP | 59-087635 | 5/1984 |
| JP | 57013301 | 1/1998 |
| JP | 2000357309 | 12/2000 |
| WO | 0137019 | 5/2001 |
| WO | 02084828 | 10/2002 |
| WO | 02103417 | 12/2002 |

OTHER PUBLICATIONS

Kazharsky, Oleg, et al., "Broad Continuous Frequency Tuning of a Diode Laser with an External Cavity", Elsevier Science B.V., Optics Communications 137, pp. 77-82, Apr. 15, 1997.

U.S. Appl. No. 10/473,941, filed Oct. 3, 2003, Burkhard Seitz et al.

* cited by examiner

ADJUSTMENT METHOD, PARTICULARLY A LASER ADJUSTMENT METHOD, AND AN ACTUATOR SUITABLE FOR THE SAME

The invention concerns an adjustment method, particularly for adjusting optical or fiber optical components, with the features of the preamble of patent claim 1. Moreover, the invention concerns an actuator which is suitable for the same.

Laser adjustment methods and actuators suitable for the same have been developed in recent times to enable extremely precise adjustment, e.g., of micromechanical components.

The basic principle of laser adjustment consists of heating a predetermined region of an actuator using a high-energy, preferably pulsed laser beam in a short time, in which the thermal expansion of the relevant region is blocked by corresponding further regions of the actuator. In this manner, compression strains build up in this heated region, which result in a plastic deformation of this region upon reaching the yield point. When this region is cooled down after the high-energy laser beam is switched off, the thermal shrinkage of this region is again essentially prevented by the further regions of the actuator. This leads to the build-up of tensile stresses in the previously heated region which lead to a defined deformation of the actuator, in which the adjustment of a component joined to the actuator is enabled in this process.

The basic principle of such an adjustment method is illustrated in FIG. 1. FIG. 1a shows the starting state of a bar 3 made of a suitable material which is restrained between two rigid demarcations 1. At the starting temperature, e.g., room temperature (20° C.), the bar 3 has a length $l_0$. The center region 3a of the bar 3 is heated by a laser beam 5 in a short time.

Figure 1B:
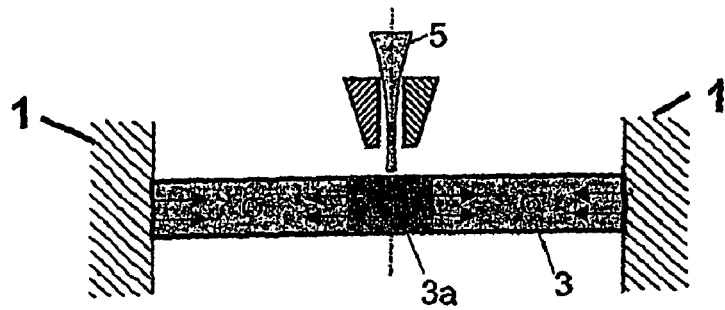

This results in the first place in compressive stresses $\sigma^{(-)}$ in the bar 3 since the thermal longitudinal expansion of the bar 3 is blocked by the rigid demarcations 1. In this phase, a negative expansion $\epsilon$ is also customarily defined which corresponds to the compressive stresses formed in the bar 3. This phase of the adjustment method is illustrated in FIG. 1b.

Figure 1C:
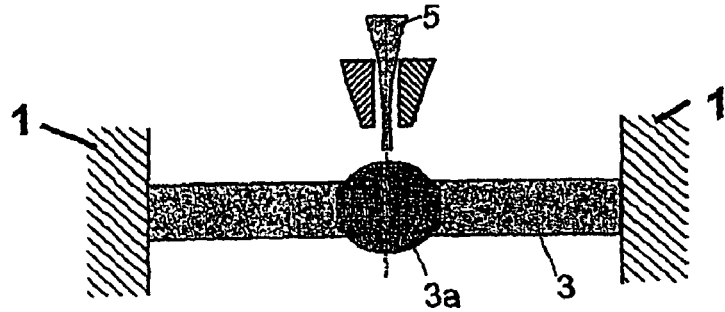
Figure 1D:
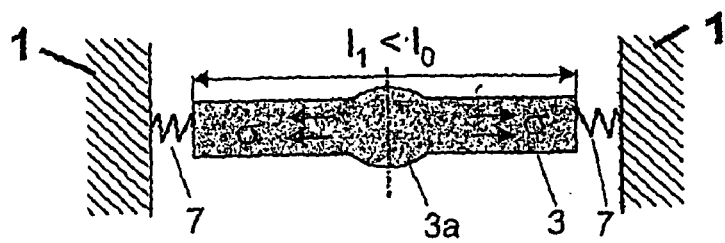

If the compressive stresses $\sigma^{(-)}$ exceed the temperature-dependent yield point $\sigma_F$, a plastic deformation of the bar 3 arises in the region 3a. Correspondingly, the compressive stresses in the bar 3 are reduced. This situation is illustrated in FIG. 1c.

After the laser beam 5 is switched off, the region 3a of the bar 3 begins to cool off, causing a thermal shrinkage of the bar 3. In this process, tensile stresses $\sigma^{(+)}$ arise in the bar 3 which in actual practice frequently lie in the vicinity of the temperature-dependent yield point $\sigma_F(T)$. This situation is represented symbolically in FIG. 1d because seen in the longitudinal direction of the bar 3 whose ends are joined by means of spring elements 7 to the rigid demarcations 1 . . . [Note: incomplete sentence in the German original]. The spring forces corresponding to the tensile stresses $\sigma^{(+)}$ cause a defined deformation of the actuator in a practically realized actuator. In this connection, FIG. 1d also shows that the tensile stresses $\sigma^{(+)}$ arise through the shortening of the bar 3 due to the plastic deformation in the region 3a caused during the heating, in which the length of the bar $l_1$ after the adjustment procedure at the starting temperature is smaller than the original length $l_0$ at the starting temperature.

A problem in the previously known adjustment methods consists in that, as was previously mentioned, the tensile stresses frozen in the bar 3 lie relatively close to the yield point $\sigma_F$. The same can apply also to the compressive stresses which occur in those regions which block the thermal expansion or rather the thermal shrinkage of the bar. Since micromechanical or optical components or rather subassemblies in actual practice are always specified for a certain temperature range, e.g., a range from −40° C. to +80° C., and must fulfill predetermined requirements for accuracy and long-term stability within the specified range, there results in previously known adjustment methods a maladjustment of the actuator if the adjusted components or rather the subassembly is brought to a temperature in the upper region of the specified range and the original adjustment was carried out at a significantly lower temperature, such as room temperature. This effect is caused by the temperature dependency of the yield point $\sigma_F$, most materials which are suitable for the manufacture of actuators for laser adjustment methods having a yield point which decreases with increasing temperature. If a temperature is reached at which the yield point $\sigma_F$ falls below the value of the frozen-in tensile stresses, this results in a flowing of the material and in a reduction of the tensile stresses to the value of the yield point $\sigma_F$ at the relevant temperature. Naturally, this is associated with a corresponding maladjustment of the actuator which is not acceptable at least for components requiring extremely precise adjustment which must be specified over a wide temperature range.

The underlying object of the invention is therefore to create an adjustment method, particularly for adjusting optical or fiber optical components, with which improved long-term stability of an adjusted actuator or rather a subassembly having such an actuator can be ensured within a predetermined temperature range, it being possible to carry out the method quickly and at a low cost. Moreover, the underlying object of the invention is to create a special actuator for simply carrying out the method.

The invention is based on the insight that the adjustment of an actuator can be carried out in an advantageous manner at a critical temperature $T_k$ with regard to the predetermined usage temperature range of the actuator. In this connection, a critical temperature $T_k$ is understood to be a temperature at which the yield point has a value such that when passing through the entire usage temperature range, only minor maladjustments of the adjusted actuator can occur which lie within specified tolerances. With conventional actuator materials, which have within a specification range a yield point that decreases at higher temperatures, one will choose the critical temperature in the upper region of the specification range or even a temperature lying above its upper limit $T_o$.

According to an embodiment of the invention, the critical temperature $T_k$ can essentially be chosen to be that temperature within the usage temperature range at which the minimum yield point $\sigma_F$ of the material is attained within the usage temperature range. In this case, it is ensured that within the usage temperature range, no flowing of the material occurs in those regions of the actuator in which internal stresses occur as a result of the adjustment procedure.

The possibility explained above of selecting an even higher temperature is limited in actual practice by the fact that often such components are also contained in subassemblies which may be subjected as a maximum temperature to the upper temperature $T_o$ of the usage temperature range.

According to an embodiment of the method, an entire subassembly including the actuator can be brought to the critical temperature $T_k$ during the adjustment procedure. If only subregions of the actuator are brought to the critical temperature $T_k$ during the adjustment procedure, at least those regions must be included which are subject to thermal shrinkage but also those which prevent such shrinkage.

A special actuator with which the method according to the invention can be implemented in a particularly simple manner is formed such that at least the essential regions of the actuator consist of a material whose yield point $\sigma_F$ assumes a minimum value within the entire usage temperature range essentially at room temperature. Using an actuator of this sort, an adjustment procedure can be carried out as usual at room temperature.

According to an embodiment of the invention, the actuator or rather the essential regions of the actuator can consist of a material whose yield point does not drop or rather remains essentially constant over the entire usage temperature range. For example, TiV13Cr11A13 can be used as a material for the actuator or rather the essential regions of the actuator. The 0.2% permanent elongation limit, resistance to extension and yield point of this material does not decrease measurably up to a temperature of 100° C.

Further embodiments of the invention follow from the dependent claims.

Figure 2:
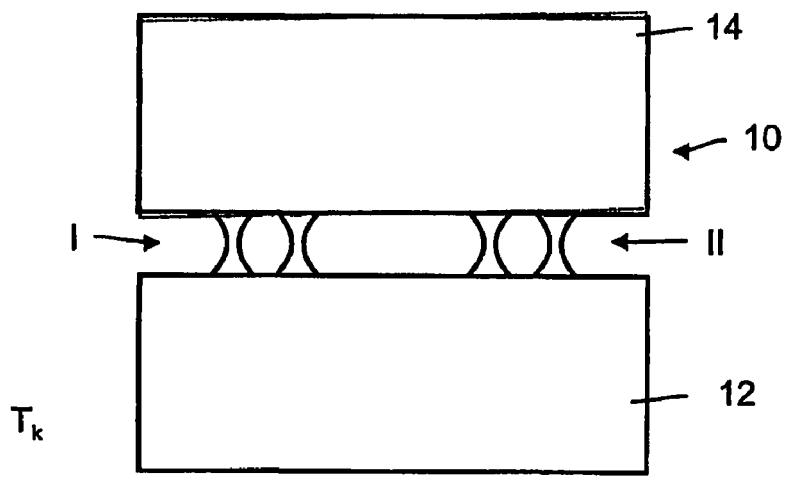

The invention is described hereafter in greater detail based on the figures shown in the drawing. The figures are as follows:

FIG. 1: Schematic representations of the laser beam adjustment method;

FIG. 2: An embodiment of a practical actuator having two double bridges; and

Figure 3:
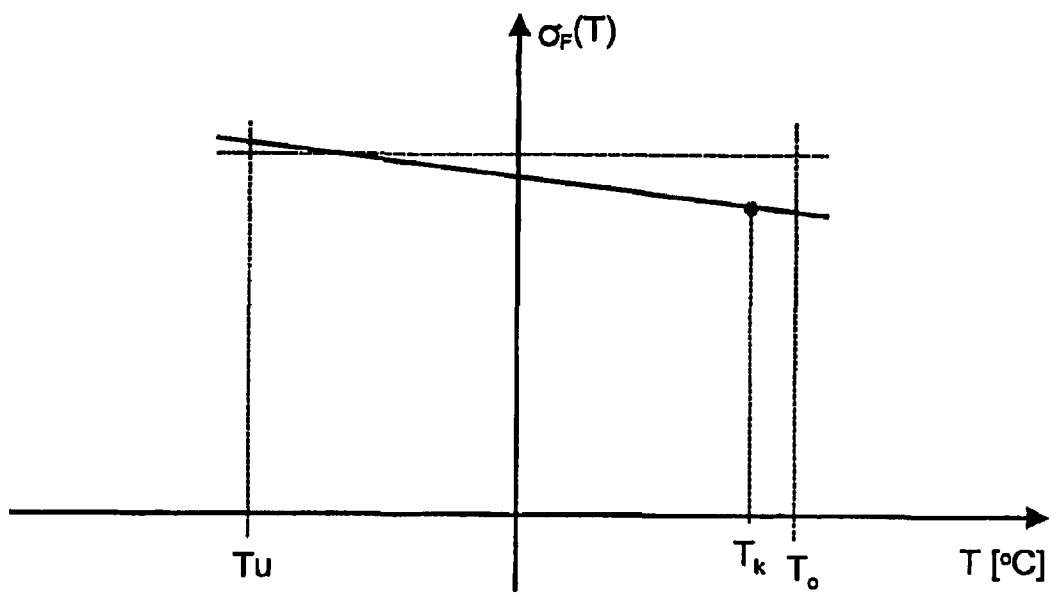

FIG. 3: A chart showing the temperature-dependent yield point $\sigma_F(T)$ in a conventional actuator material within a usage temperature range $[T_u; T_o]$.

The laser beam adjustment method explained in basic terms in the introduction is illustrated again briefly in greater detail based on a practical actuator 10 shown in FIG. 2. The actuator 10 consists of a base region 12 which is joined by means of two double bridges I, II to an adjustment region 14. For adjustment purposes, in each case one of the two bridges of the double bridges I, II is irradiated preferably in the center (in relation to the longitudinal axis of a bridge) using a high-power laser beam. For example, if the bridge shown to the left in FIG. 2 of the double bridge I is heated in its center region using the laser beam, then the affected bridge attempts to expand, the thermal expansion being essentially blocked by the right bridge of the double bridge I. In this process, the left double bridge is deformed in its center region. During the cooling, the left bridge of the double bridge I attempts to draw together, through which corresponding tensile stresses arise in it in this process, since this movement is also blocked largely by the right bridge. If in a next step the center region of the bridge shown to the right in FIG. 2 of the double bridge I is also irradiated using the laser, then this region will be deformed due to the tensile stresses present in the left bridge and the compressive stress present in the right bridge (in addition to the compressive stresses which are caused by a thermal expansion of the right bridge). During the cooling, the right bridge of the double bridge I attempts to draw together further, such that this movement is blocked in turn by the left bridge. Accordingly, internal stresses remain, which are formed in the right bridge as tensile stresses and in the left bridge as compressive stresses.

As a result of this adjustment procedure, the adjustment region 14 is tilted slightly with respect to the starting position shown in FIG. 2 using a continuous line as a result of the shortening of the two bridges of the double bridge I. This situation is illustrated in FIG. 2 using a dashed line. In this manner, an adjustment of the angle of a component (not shown) arranged on the adjustment region 14 can occur. If the right double bridge II is also adjusted correspondingly, then highly precise adjustment of a component arranged on the adjustment region 14 can occur in the longitudinal direction of the bridges.

If the adjustment procedures are carried out at an critical temperature $T_k$, in which it is necessary for at least the double bridge to be adjusted or rather for both double bridges to be adjusted to be at this temperature, then upon suitable choice of the critical temperature $T_k$ only such internal stresses are frozen in as a consequence of the adjustment procedure(s) which, even in case of longer-term storage of the actuator 10 at an arbitrary temperature within a predetermined usage temperature range $[T_u; T_o]$, lead to such maladjustments that lie within acceptable tolerances.

If, for example, the actuator material exhibits the curve of its temperature-dependent yield point $\sigma_F(T)$ shown in FIG. 3 as a continuous line, then one will choose, as shown in FIG. 3, the critical temperature $T_k$ in the upper region of the usage temperature range $[T_u; T_o]$. The critical temperature $T_k$ must be chosen for the monotonically decreasing curve of the yield point $\sigma_F(T)$ shown in FIG. 3 to be so high that even in case of longer-term storage of the actuator at the upper limit $T_u$ of the usage temperature range only such a maladjustment will occur as a consequence of a reduction in internal stresses in the essential regions of the actuator that lies within specified permissible tolerances.

If one assumes that in the essential regions of the actuator internal stresses are frozen in which lie extremely close to the yield point at the critical temperature or rather the adjustment temperature chosen in each case, then a maladjustment in case of longer-term storage of the actuator at the temperature $T_o$ can be avoided in full only if the critical temperature $T_k$ is chosen to be equal to the upper range limit $T_o$.

If a material is chosen for the actuator or its essential regions whose yield point $\sigma_F(T)$ over the entire usage temperature range $[T_u; T_o]$ is essentially constant, then the critical temperature $T_k$ can be chosen arbitrarily. Here, one will preferably choose the temperature $T_k$ in the room temperature range to achieve the lowest cost.

Finally, it should be mentioned that the heating of the essential regions of the actuator, the overall actuator or an overall subassembly including the actuator can take place, for example, through irradiation with an infrared radiation source by using a customary, heated temperature chamber or a heated holder, or even using a laser beam which, suitably expanded, is either aimed at the essential regions or which "scans" the essential regions at a suitable speed.

The invention claimed is:

1. An optical subassembly and adjustment system comprising:
   an actuator;
   an optical component physically joined to the actuator;
   means for heating at least a portion of the actuator to a critical temperature determined relative to a usage temperature range of the actuator;
   means for locally heating a selected subregion of the at least a portion of the actuator brought to the critical temperature such that compressive stresses arise in the selected subregion, which, upon reaching a yield point of the material of the selected subregion, results in plastic deformation of the selected subregion; and
   means for cooling the selected subregion, such that the selected subregion is shortened, resulting in a defined geometric change of the actuator and corresponding displacement of the optical component to a predetermined position, wherein the actuator comprises:
   a base;
   an adjustment region that moves in response to the means for locally heating and the means for cooling; and a pair of double bridges that connect the base and the adjustment region, wherein the selected subregion is included in one of the bridges of the pair of double bridges.

2. The optical subassembly and adjustment system of claim 1, wherein at least the selected subregion of the actuator is formed from a material having a yield point that assumes a minimum value within the entire usage temperature range essentially at room temperature.

3. The optical subassembly and adjustment system of claim 1, wherein the means for locally heating the selected subregion comprises a laser.

4. The optical subassembly and adjustment system of claim 3, wherein the laser comprises an Nd:YAG laser.

5. The optical subassembly and adjustment system of claim 3, wherein the laser comprises a diode laser.

6. The optical subassembly and adjustment system of claim 1, wherein the critical temperature is selected to be essentially the temperature within the usage temperature range at which the minimum yield point of the material is attained.

7. The optical subassembly and adjustment system of claim 1, wherein the material of the selected subregion has a yield point that drops monotonically within the usage temperature range.

8. The optical subassembly and adjustment system of claim 7, wherein the critical temperature is selected to be essentially the temperature at an upper limit of the usage temperature range.

9. The optical subassembly and adjustment system of claim 1, the means for locally heating and the means for cooling causing tensile stresses to arise in a first subregion of the actuator and, in a second region of the actuator, causing the compressive stresses to be frozen.

10. The optical subassembly and adjustment system of claim 1, the means for heating the at least a portion of the actuator to the critical temperature including an infrared radiation source.

11. The optical subassembly and adjustment system of claim 1, the means for heating the at least a portion of the actuator to the critical temperature including a laser.

12. The optical subassembly and adjustment system of claim 11, the laser being configured to scan a laser beam over the at least a portion of the actuator to bring the at least a portion of the actuator to the critical temperature.

13. The optical subassembly and adjustment system of claim 1, the means for heating the at least a portion of the actuator to the critical temperature being configured to bring a subassembly including the actuator to the critical temperature.

* * * * *